(12) United States Patent
Srinivasan et al.

(10) Patent No.: US 8,634,415 B2
(45) Date of Patent: Jan. 21, 2014

(54) METHOD AND SYSTEM FOR ROUTING NETWORK TRAFFIC FOR A BLADE SERVER

(75) Inventors: Arvind Srinivasan, San Jose, CA (US); Marcelino M. Dignum, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 317 days.

(21) Appl. No.: 13/028,650

(22) Filed: Feb. 16, 2011

(65) Prior Publication Data

US 2012/0207156 A1    Aug. 16, 2012

(51) Int. Cl.
H04L 12/28    (2006.01)

(52) U.S. Cl.
USPC .......................................................... 370/389

(58) Field of Classification Search
USPC .................. 370/229, 254, 389, 392, 395, 401
See application file for complete search history.

(56) References Cited

U.S. PATENT DOCUMENTS

| | | | |
|---|---|---|---|
| 6,041,053 | A | 3/2000 | Douceur et al. |
| 6,070,219 | A | 5/2000 | McAlpine et al. |
| 6,131,163 | A | 10/2000 | Wiegel |
| 6,163,539 | A | 12/2000 | Alexander et al. |
| 6,269,401 | B1 | 7/2001 | Fletcher et al. |
| 6,477,643 | B1 | 11/2002 | Vorbach et al. |
| 6,594,775 | B1 | 7/2003 | Fair |
| 6,600,721 | B2 | 7/2003 | Edholm |
| 6,714,960 | B1 | 3/2004 | Bitar et al. |
| 6,757,731 | B1 | 6/2004 | Barnes et al. |
| 6,771,595 | B1 | 8/2004 | Gilbert et al. |
| 6,831,893 | B1 | 12/2004 | Ben Nun et al. |
| 6,859,841 | B2 | 2/2005 | Narad et al. |
| 6,944,168 | B2 | 9/2005 | Paatela et al. |
| 6,985,937 | B1 | 1/2006 | Keshav et al. |
| 7,046,665 | B1 | 5/2006 | Walrand et al. |
| 7,111,303 | B2 | 9/2006 | Macchiano et al. |
| 7,120,152 | B2 | 10/2006 | Park |
| 7,146,431 | B2 | 12/2006 | Hipp et al. |

(Continued)

FOREIGN PATENT DOCUMENTS

WO    2005057318 A2    6/2005
WO    2008093174 A1    8/2008

OTHER PUBLICATIONS

International Search Report and Written Opinion for PCT/US2012/020746 dated Mar. 13, 2012 (9 pages).

(Continued)

*Primary Examiner* — Dang Ton
*Assistant Examiner* — Nourali Mansoury
(74) *Attorney, Agent, or Firm* — Osha Liang LLP

(57) ABSTRACT

A system and method for routing network traffic for a blade server chassis, involving receiving a packet by a network express manager (NEM); obtaining the L2 address, the L3 address, and the L4 address from the packet; obtaining a first mapping that associates the L2 address with a network function; obtaining a second mapping that associates the network function with a configuration; generating a key based on the network function, the L3 address, and the L4 address; obtaining a third mapping that associates the key with a policy; making a determination to transmit the packet based on the policy; based on the determination, selecting a direct memory access (DMA) engine for transmitting the packet based on the configuration; and based on the determination, transmitting the packet to a blade using the DMA engine and the network function.

18 Claims, 9 Drawing Sheets

(56) References Cited

U.S. PATENT DOCUMENTS

| | | | |
|---|---|---|---|
| 7,177,311 B1 | 2/2007 | Hussain et al. | |
| 7,200,704 B2 | 4/2007 | Njoku et al. | |
| 7,260,102 B2 | 8/2007 | Mehrvar et al. | |
| 7,313,142 B2 | 12/2007 | Matsuo et al. | |
| 7,450,498 B2 | 11/2008 | Golia et al. | |
| 7,480,302 B2 * | 1/2009 | Choi | 370/395.32 |
| 7,502,884 B1 | 3/2009 | Shah et al. | |
| 7,561,531 B2 | 7/2009 | Lewites et al. | |
| 7,613,132 B2 | 11/2009 | Tripathi et al. | |
| 7,620,955 B1 | 11/2009 | Nelson | |
| 7,633,955 B1 | 12/2009 | Saraiya et al. | |
| 7,688,838 B1 | 3/2010 | Aloni et al. | |
| 7,694,298 B2 | 4/2010 | Goud et al. | |
| 7,730,205 B2 * | 6/2010 | Rothman et al. | 709/238 |
| 7,730,486 B2 | 6/2010 | Herington | |
| 7,782,868 B2 * | 8/2010 | Hsieh et al. | 370/395.32 |
| 7,827,598 B2 | 11/2010 | Moran et al. | |
| 7,865,781 B2 * | 1/2011 | Fox et al. | 1/1 |
| 7,885,257 B2 | 2/2011 | Droux et al. | |
| 8,295,275 B2 | 10/2012 | Mann | |
| 8,370,530 B2 * | 2/2013 | Tripathi et al. | 709/250 |
| 2002/0052972 A1 | 5/2002 | Yim | |
| 2002/0080721 A1 | 6/2002 | Tobagi et al. | |
| 2003/0037154 A1 | 2/2003 | Poggio et al. | |
| 2003/0120772 A1 | 6/2003 | Husain et al. | |
| 2004/0015966 A1 | 1/2004 | MacChiano et al. | |
| 2004/0199808 A1 | 10/2004 | Freimuth et al. | |
| 2004/0202182 A1 | 10/2004 | Lund et al. | |
| 2004/0210623 A1 | 10/2004 | Hydrie et al. | |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |
| 2005/0138620 A1 | 6/2005 | Lewites | |
| 2005/0182853 A1 | 8/2005 | Lewites et al. | |
| 2005/0251802 A1 | 11/2005 | Bozek et al. | |
| 2006/0041667 A1 | 2/2006 | Ahn et al. | |
| 2006/0045088 A1 | 3/2006 | Nguyen | |
| 2006/0045089 A1 | 3/2006 | Bacher et al. | |
| 2006/0070066 A1 | 3/2006 | Grobman | |
| 2006/0092928 A1 | 5/2006 | Pike et al. | |
| 2006/0174324 A1 | 8/2006 | Zur et al. | |
| 2006/0206300 A1 | 9/2006 | Garg et al. | |
| 2006/0206602 A1 | 9/2006 | Hunter et al. | |
| 2006/0233168 A1 | 10/2006 | Lewites et al. | |
| 2006/0236063 A1 | 10/2006 | Hausauer et al. | |
| 2006/0253619 A1 | 11/2006 | Torudbakken et al. | |
| 2007/0019646 A1 | 1/2007 | Bryant et al. | |
| 2007/0047536 A1 | 3/2007 | Scherer et al. | |
| 2007/0078988 A1 | 4/2007 | Miloushev et al. | |
| 2007/0083723 A1 | 4/2007 | Dey et al. | |
| 2007/0101323 A1 | 5/2007 | Foley et al. | |
| 2007/0183418 A1 | 8/2007 | Riddoch et al. | |
| 2007/0244937 A1 | 10/2007 | Flynn et al. | |
| 2007/0244972 A1 | 10/2007 | Fan | |
| 2008/0002683 A1 | 1/2008 | Droux et al. | |
| 2008/0005748 A1 | 1/2008 | Mathew et al. | |
| 2008/0019365 A1 | 1/2008 | Tripathi et al. | |
| 2008/0022016 A1 | 1/2008 | Tripathi et al. | |
| 2008/0043765 A1 | 2/2008 | Belgaied et al. | |
| 2008/0144635 A1 | 6/2008 | Carollo et al. | |
| 2008/0171550 A1 | 7/2008 | Zhao | |
| 2008/0192648 A1 | 8/2008 | Galles | |
| 2008/0225875 A1 | 9/2008 | Wray et al. | |
| 2008/0239945 A1 | 10/2008 | Gregg | |
| 2008/0253379 A1 | 10/2008 | Sasagawa | |
| 2008/0270599 A1 | 10/2008 | Tamir et al. | |
| 2009/0006593 A1 | 1/2009 | Cortes | |
| 2009/0125752 A1 | 5/2009 | Chan et al. | |
| 2009/0150576 A1 | 6/2009 | Madruga et al. | |
| 2009/0150883 A1 | 6/2009 | Tripathi et al. | |
| 2009/0328073 A1 | 12/2009 | Tripathi | |
| 2010/0046531 A1 | 2/2010 | Louati et al. | |
| 2010/0332698 A1 | 12/2010 | Muller | |
| 2011/0019574 A1 | 1/2011 | Malomsoky et al. | |
| 2011/0080830 A1 | 4/2011 | Ko et al. | |
| 2012/0017265 A1 | 1/2012 | Twitchell, Jr. | |

OTHER PUBLICATIONS

Trapeze, Trapeze Overview, Jan. 1, 1998, USENIX, Retrieved from the Internet, <usenix.org/publications/library/proceedings/usenix98/full_papers/anderson/anderson_html/node4.html>, 2 pages.

Goldenberg, D. et al.; "Zero Copy Sockets Direct Protocol over InfiniBand—Preliminary Implementation and Performance Analysis"; Proceedings of the 13th Symposium on High Performance Interconnects; Piscataway, NJ; Aug. 17-19, 2005; pp. 128-137 (10 pages).

"I/O Virtualization Using Mellanox InfiniBand and Channel I/O Virtualization (CIOV) Technology"; XP-002541674; 2007; Retrieved from the Internet: <http://www.mellanox.com/pdf/whitepapers/WP_Virtualize_with_IB.pdf>, pp. 1-16 (16 pages).

"InfiniBand Software Stack", XP-002541744; Jan. 1, 2006; Retrieved from the Internet: <http://download.microsoft.com/download/c/3/1/c318044c-95e8-4df9-a6af-81cdcb3c53c5/Mellanox%20Technologies%20-%20Infiniband%20Software%20Stack%20-%20WinIB%20-%20external.PDF>; pp. 1-2 (2 pages).

Wheeler, B.; "10 Gigabit Ethernet in Servers: Benefits and Challenges"; XP-002541745; Jan. 2005; Retrieved from The Internet: <http://www.hp.com/products1/serverconnectivity/adapters/ethernet/10gbe/infolibrary/10GbE_White_Paper.pdf> (8 pages).

"Windows Platform Design Notes: Winsock Direct and Protocol Offload on SANs"; XP-002541746; Mar. 3, 2001; Retrieved from the Internet: <http://download.microsoft.com/download/1/6/1/161ba512-40e2-4cc9-843a-923143f3456c/WinsockDirect-ProtocolOffload.doc> (8 pages).

International Search Report from PCT/US2009/048594 dated Sep. 7, 2009 (4 pages).

Written Opinion from PCT/US2009/048594 dated Sep. 7, 2009 (1 page).

Tripathi, S.; "Crossbow Architectural Document"; Nov. 21, 2006; 19 pages.

Nordmark; E.; "IP Instances—Network Isolation Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Office Action in United States Patent and Trademark Office for U.S. Appl. No. 11/953,829, Mailed Aug. 4, 2010 (30 pages).

Office Action in United States Patent and Trademark Office for U.S. Appl. No. 11/953,837, Mailed Jun. 11, 2010 (27 pages).

Office Action in United States Patent and Trademark Office for U.S. Appl. No. 11/953,839, Mailed Aug. 19, 2010 (30 pages).

Office Action in United States Patent and Trademark Office for U.S. Appl. No. 12/040,165, Mailed Feb. 8, 2010 (40 pages).

Notice of Allowance in United States Patent and Trademark Office for U.S. Appl. No. 12/040,165, Mailed Oct. 29, 2010 (18 pages).

Office Action in United States Patent and Trademark Office for U.S. Appl. No. 12/040,101, Mailed May 6, 2010 (39 pages).

Office Action in United States Patent and Trademark Office for U.S. Appl. No. 11/953,842, Mailed Apr. 30, 2010 (39 pages).

Final Office Action in United States Patent and Trademark Office for U.S. Appl. No. 11/953,842, Mailed Oct. 15, 2010 (32 pages).

Office Action in United States Patent and Trademark Office for U.S. Appl. No. 12/040,105, Mailed Nov. 20, 2009 (93 pages).

Final Office Action in United States Patent and Trademark Office for U.S. Appl. No. 12/040,105, Mailed May 26, 2010 (26 pages).

Notice of Allowance in United States Patent and Trademark Office for U.S. Appl. No. 12/040,105, Mailed Oct. 5, 2010 (27 pages).

Office Action in United States Patent and Trademark Office for U.S. Appl. No. 11/953,843, Mailed May 3, 2010 (169 pages).

Final Office Action in United States Patent and Trademark Office for U.S. Appl. No. 11/953,843, Mailed Oct. 15, 2010 (33 pages).

Office Action in United States Patent and Trademark Office for U.S. Appl. No. 12/053,666, Mailed Dec. 10, 2009 (36 pages).

(56) References Cited

OTHER PUBLICATIONS

Final Office Action in United States Patent and Trademark Office for U.S. Appl. No. 12/053,666, Mailed Jun. 11, 2010 (27 pages).
Notice of Allowance in United States Patent and Trademark Office for U.S. Appl. No. 12/053,666, Mailed Oct. 7, 2010 (15 pages).
Office Action in United States Patent and Trademark Office for U.S. Appl. No. 12/053,676, Mailed Dec. 9, 2009 (41 pages).
Notice of Allowance in United States Patent and Trademark Office for U.S. Appl. No. 12/053,676, Mailed Jul. 15, 2010 (20 pages).
Final Office Action in United States Patent and Trademark Office for U.S. Appl. No. 12/040,101, Mailed Dec. 13, 2010 (25 pages).
Kumar, R., ASI and PCI Express: Complementary Solutions, Dec. 2004, RTC Magazine, Retrieved from the Internet <rtcmagazine.com/articles/view/100274>, (5 pages).
Martinez, R., Alfaro, F.J., and Sanchez, J.L., Provising Quality of Service Over Advanced Switching, 2006, IEEE, Retrieved from the Internet, <ieeexplore.ieee.org/xpls/abs_all.jsp?arnumber=1655667&tag=1>, 10 pages.
Apani, Brave New World, Feb. 1, 2007, iSmile, Retrieved from the Internet, <isimile.com/PDFs/Apani_Segmentation_WP.pdf>, 8 pages.
OpenSolaris, Popuri, OpenSolaris Virtualization Technologies, Feb. 23, 2007, Retrieved from the Internet,<hub.opensolaris.org/bin/view/Community+Group+advocacy/techdays%2Darchive%2D06%2D07>, 2 pages.
International Search Report dated Aug. 19, 2009 (3 pages).
International Preliminary Report on Patentability issued in PCT/US2009/035405, Dated Sep. 10, 2010. (9 pages).
Dovrolis, C., Thayer, B. and Ramanathan, P.: HIP: Hybrid Interrupt—Polling for the Network Interface:. ACM SIGOPS Operating Systems Review, vol. 35, Iss. 4, Oct. 2001, (11 pages).
Tripathi, S.; "Solaris Networking—The Magic Revealed (Part I)"; Sunay Tripathi's Solaris Networking Weblog; Nov. 14, 2005, pp. 1-22 (22 pages).
Tripathi, S.; "CrossBow: Solaris Network Virtualization and Resource Control"; Crossbow Architectual Document, Nov. 21, 2006; 19 pages.
Nordmark, E. et al. ; "IP Instances Interface Document"; PSARC 2006/366, Dec. 28, 2006; 17 pages.
Nordmark, E.; "IP Instances Design Document"; PSARC 2006/366, Dec. 21, 2006; 38 pages.
Tripathi, S.; "CrossBow: Solaris Network Virtualization & Resource Control"; CrossBow Overview Document, Aug. 23, 2006; 12 pges.
Nordmark, E.; "IP Instances—Network Isolation Meets Zones"; presented at the SVOSUG meeting, Oct. 26, 2006; 28 pages.
Tripathi, S.; "CrossBow: Network Virtualization and Resource Control"; presented at the SVOSUG meeting, Aug. 24, 2006; 28 pages.
Tripathi, S.; "Crossbow: ReCap"; presented at an internal Sun Labs Open House presentation on Jun. 1, 2006, made public Aug. 2006; 23 pages.
International Report on Patentability issued in PCT/US2012/020746 mailed Aug. 29, 2013 (7 pages).

\* cited by examiner

| L2 Address | Network Function |
|---|---|
| L2a | NFa |
| • | • |
| • | • |
| L2x | NFx |
| • | • |
| L2z | NFz |

FIG. 2a

| Network Function | Configuration |
|---|---|
| NFa | Ca |
| • | • |
| • | • |
| NFx | Cg |
| • | • |
| NFz | Cm |

FIG. 2b

| Key | Policy |
|---|---|
| Ka | Pa |
| • | • |
| • | • |
| Kx | Pg |
| • | • |
| Kz | Pm |

FIG. 2c

METHOD AND SYSTEM FOR ROUTING NETWORK TRAFFIC FOR A BLADE SERVER

BACKGROUND

Conventionally, in the computer-related arts, a network is an arrangement of physical computer systems configured to communicate with each other. In some cases, the physical computer systems may include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (i.e., using a tangible connection medium such as Ethernet cables) or wireless (i.e., using an intangible connection medium such as radio waves). Different connection methods may also be combined in a single network. For example, a wired network may be extended to allow devices to connect to the network wirelessly. However, core network components such as routers, switches, and servers are generally connected using physical wires.

To create a wired network, computer systems must be physically connected to each other. That is, the ends of physical wires (e.g., Ethernet cables) must be physically connected to network interface cards in the computer systems forming the network. To reconfigure the network (e.g., to replace a server or change the network topology), one or more of the physical wires must be disconnected from a computer system and connected to a different computer system.

Network traffic may be transmitted over a network (e.g., the Internet) from a sending system to a receiving system (e.g., from one computer system to another computer system). Each system may be configured with a physical network interface card (PNIC). A PNIC is a physical hardware device found in a typical computer system that may be used to service one or more network connections by sending and receiving network traffic. Typically, network traffic is transmitted in the form of data packets, where each data packet includes a header and a payload. The header contains information regarding the source address, destination address, size, transport protocol used to transmit the data packet, and various other information associated with the data packet. The payload contains the actual data to be transmitted to the receiving system.

SUMMARY

In general, in one aspect, the invention relates to a method for routing network traffic for a blade server chassis. The method involves receiving a first packet by a network express manager (NEM) executing on a processor for the blade server chassis, where the blade server chassis includes the NEM, a chassis interconnect, a set of blades operatively connected to the chassis interconnect, and a physical network interface card (PNIC), and where a first packet header for the first packet specifies a first Layer 2 (L2) address, a first Layer 3 (L3) address, and a first Layer 4 (L4) L4 address; obtaining, by the NEM, the first L2 address, the first L3 address, and the first L4 address from the first packet; obtaining, by the NEM, a first mapping that associates the first L2 address with a first network function; obtaining, by the NEM, a second mapping that associates the first network function with a first configuration; generating, by the NEM, a first key based on the first network function, the first L3 address, and the first L4 address; obtaining, by the NEM, a third mapping that associates the first key with a first policy; and making a first determination, by the NEM, to transmit the first packet based on the first policy. The method also involves, based on the first determination, selecting, by the NEM, a first direct memory access (DMA) engine for transmitting the first packet based on the first configuration; and transmitting, by the NEM, the first packet to a first blade from the set of blades using the first DMA engine and the first network function.

In general, in one aspect, the invention relates to a system. The system includes a physical network interface card (PNIC); a chassis interconnect; a set of blades operatively connected to the chassis interconnect; a ternary content-addressable memory (TCAM) device including a set of mappings; and a network express manager (NEM) executing on a processor. The NEM is configured to receive a first packet, wherein the first packet specifies a first Layer 2 (L2) address, a first Layer 3 (L3) address, and a first Layer 4 (L4) address; obtain the first L2 address, the first L3 address, and the first L4 address from the first packet; obtain a first mapping from the set of mappings that associates the first L2 address with a first network function; obtain a second mapping from the set of mappings that associates the first network function with a first configuration; generate a first key based on the first network function, the first L3 address, and the first L4 address; obtain a third mapping from the set of mappings that associates the first key with a first policy; and make a first determination to transmit the first packet based on the first policy. The NEM is further configured to, based on the first determination, select a first direct memory access (DMA) engine for transmitting the first packet based on the first configuration; and transmit the first packet to a first blade from the set of blades using the first DMA engine and the first network function.

In general, in one aspect, the invention relates to a non-transitory computer readable storage medium having computer readable program code embodied therein, the computer readable program code adapted to, when executed by a processor, implement a method. The method includes receiving a first packet by a network express manager (NEM) executing on a processor for the blade server chassis, where the blade server chassis includes the NEM, a chassis interconnect, a set of blades operatively connected to the chassis interconnect, and a physical network interface card (PNIC), and where a first packet header for the first packet specifies a first Layer 2 (L2) address, a first Layer 3 (L3) address, and a first Layer 3 (L4) address; obtaining, by the NEM, the first L2 address, the first L3 address, and the first L4 address from the first packet; performing, by the NEM, a hash of the first L2 address to select a first network function from a set of network functions associated with the first L2 address, where the first L2 address is associated with the first network function using a first mapping; obtaining, by the NEM, a second mapping that associates the first network function with a first configuration; generating, by the NEM, a first key based on the first network function, the first L3 address, and the first L4 address; obtaining, by the NEM, a third mapping that associates the first key with a first policy; and making a first determination, by the NEM, to transmit the first packet based on the first policy. The method also involves, based on the first determination, selecting, by the NEM, a first direct memory access (DMA) engine for transmitting the first packet based on the first configuration; and transmitting, by the NEM, the first packet to a first blade from the set of blades using the first DMA engine and the first network function.

Other aspects of the invention will be apparent from the following description and the appended claims.

BRIEF DESCRIPTION OF DRAWINGS

FIGS. 2a-2c show examples of mappings used to maintain data in accordance with one or more embodiments of the invention.

DETAILED DESCRIPTION

Figure 1A:
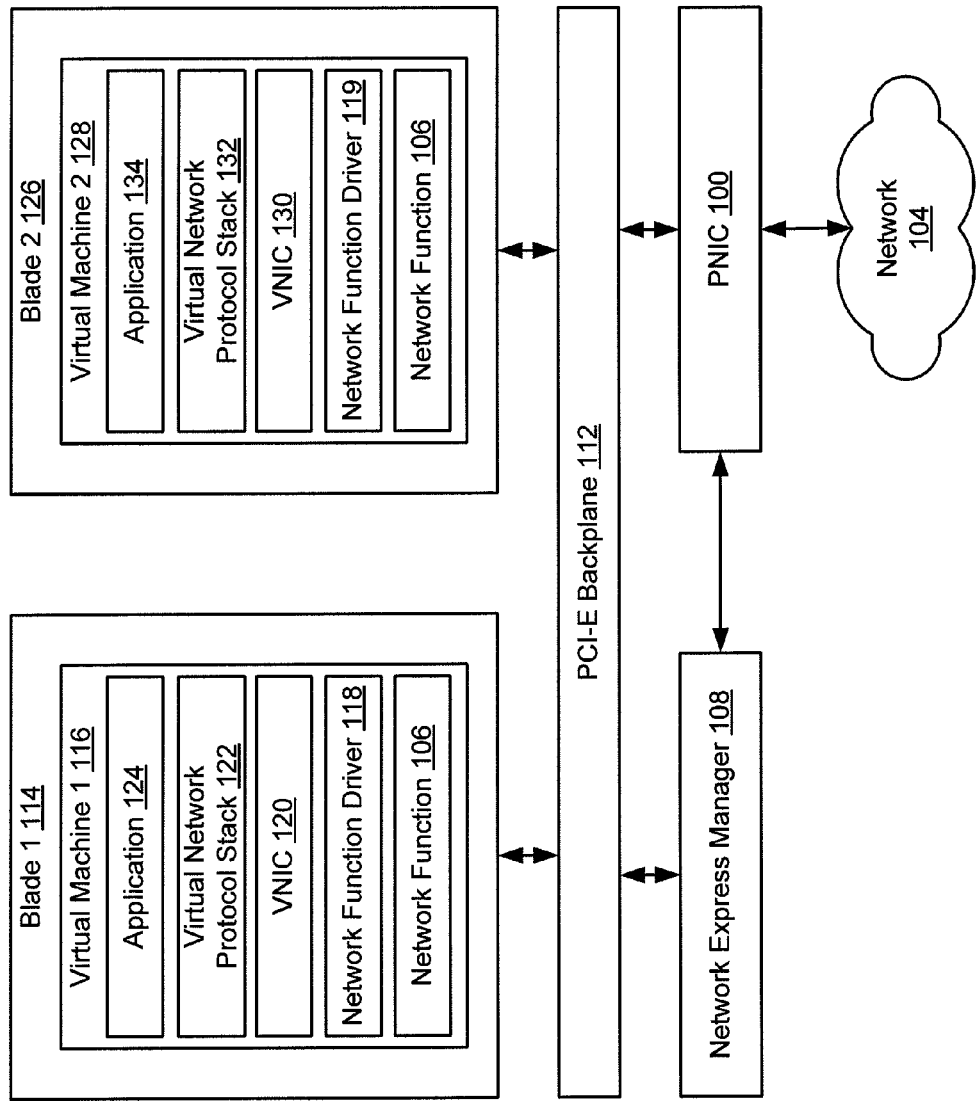
FIGS. 1a-1b show examples of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for routing network traffic for a blade server chassis. Embodiments of the invention involve the use of one or more physical network interface cards (PNICs) in accordance with PCI-SIG® SR-IOV (single-root) and PCI-SIG® MR-IOV (multi-root) specifications. PCI-SIG® and PCI™ are trademarks of the Peripheral Component Interconnect-Special Interest Group (PCI-SIG) of Beaverton, Oreg.

Under the PCI-SIG® SR-IOV specification, a PCI™-compliant PNIC (i.e., a single root) is defined as having at least one network function used in the configuration and management of the PNIC. In one or more embodiments of the invention, a network function may be a physical or virtual function used to manage data movement for the PNIC. In one or more embodiments of the invention, a physical function is a full PCI™ function used for configuring and managing a PNIC. In one or more embodiments of the invention, a virtual function is a lightweight PCI™ function used for data movement of network traffic sent and received by the PNIC. While invoking a physical function enables control of a PNIC, invoking a virtual function does not provide control of a PNIC. Accordingly, in accordance with the PCI-SIG® SR-IOV specification, embodiments of the invention may use a network function to implement a network function mapping between a virtual machine executing on a host computer system and the PCI™-compliant PNIC operatively connected to the host computer system. Under the PCI-SIG® MR-IOV specification, a number of PCI™-compliant PNICs (i.e., multiple roots) are operative in tandem with one or more virtual machines executing for a host computer system.

Using the network function mapping, a datapath may be implemented between the virtual machine and the PNIC such that the virtual machine is provided with direct hardware access to the PNIC. Accordingly, the virtual machine may use the network function to directly transfer network traffic (i.e., data packets) between the virtual machine and the PNIC. Said another way, the network traffic is transferred between the virtual machine and the PNIC without additional processing by any intermediate layers (e.g., hypervisor, host operating system).

FIG. 1a shows an example of a system in accordance with one or more embodiments of the invention. Specifically, FIG. 1a shows components for a blade chassis in accordance with one or more embodiments of the invention. In one or more embodiments of the invention, a blade chassis may be an IBM BladeCenter® chassis, an HP BladeSystem enclosure by Hewlett Packard Inc., or any other type of blade chassis. BladeCenter® is a registered trademark of International Business Machines, Inc. (IBM), headquartered in Armonk, N.Y. As shown in FIG. 1a, in one or more embodiments of the invention, a blade chassis may include the following components: a physical network interface (100), a chassis interconnect (e.g., PCI-e Backplane (112)), multiple blades (e.g., Blade 1 (114), Blade 2 (126)) operatively connected by the chassis interconnect, and a network express manager (NEM) (108). The NEM (108) is described below with reference to FIG. 1b.

In one or more embodiments of the invention, a physical network interface (PNIC (100)) is a hardware device operatively connected to the blade chassis. Specifically, the PNIC (100) is configured to send and receive network traffic transmitted to and from the blade chassis in the form of data packets. The PNIC (100) may include one or more network ports (e.g., Ethernet ports) and provide an interface between the blade chassis and the network to which the blade chassis (100) is connected. As such, a PNIC (100) may service a network connection by transferring the inbound and outbound network traffic associated with the network connection. In one or more embodiments of the invention, the blade chassis (100) may be connected to multiple networks, for example using multiple network ports. In one or more embodiments of the invention, there may be a single PNIC (100) for a blade chassis (i.e., single root blade chassis configuration). Alternatively, in one or more other embodiments of the invention, there may be multiple PNICs (100) for a blade chassis (e.g., multi-root blade chassis configuration).

In one or more embodiments of the invention, a PNIC (100) may be a PCI™-compliant PNIC such that the PNIC is configured with one or more network functions that may be used in the configuring and managing of the PNIC. For example, in one or more embodiments of the invention, a network function may be a physical or virtual function used to manage data movement for the PNIC (100). Specifically, in accordance with the PCI-SIG® SR-IOV and MR-IOV specifications, one or more embodiments of the invention may use a network function to implement a network function mapping between a virtual machine (116, 128) executing on a blade (114, 126) and the PCI™-compliant PNIC operatively connected to the blade chassis.

In one or more embodiments of the invention, a blade (114, 126) refers to a computer system included in a blade chassis (e.g., the blade chassis shown in FIG. 1a). In one or more embodiments of the invention, a blade (114, 126) may include one or more processors and associated memory. In one or more embodiments of the invention, a blade (114, 126) may also include a storage device (e.g., hard drive) and numerous other elements and functionalities typical of modern computer systems such as a keyboard, a mouse, a monitor, and/or other input/output means. In one or more embodiments of the invention, a blade (114, 126) may include fewer components than stand-alone computer systems or conventional servers. Alternatively, in one or more other embodiments of the invention, a fully featured stand-alone computer system or conventional server may be used instead of or in combination with blades (114, 126) in a blade chassis.

In one or more embodiments of the invention, a blade (114, 126) includes a host operating system (not shown) configured to execute one or more virtual machines (e.g., Virtual Machine 1 (116), Virtual Machine 2 (128)). In one or more embodiments of the invention, a virtual machine (116, 128) is an isolated software execution environment hosted on a host operating system (not shown). Specifically, in accordance with embodiments of the invention, a virtual machine (116, 128) is configured to simulate the execution of a process as if the process were executing on a physical computing device.

In one or more embodiments of the invention, one or more executable software processes may be hosted on the virtual machine (116, 128) for a blade (114, 126). For example, as shown in FIG. 1a, a virtual machine (116, 128) may host an application (124, 134), a virtual network protocol stack (122, 132), a virtual network interface card (120, 130), a network function driver (118), and a network function (106).

In one or more embodiments of the invention, an application (124, 134) may be any user-level or kernel-level software process. In one or more embodiments of the invention, execution of the application (124, 134) may result in the generation and sending of network traffic from a virtual machine (116, 128) over a network (104). Likewise, an application (124, 134) may be a designated recipient for network traffic sent to and received by a virtual machine (116, 128) over a network (104). Examples of user-level applications include but are not limited to e-mail client software, web browsing software, or any other desktop software application. Examples of kernel-level applications include but are not limited to a guest operating system (not shown). The guest operating system executing on the virtual machine (116, 128) may or may not be the same as a host operating system (not shown) for the blade (114, 126). Further, in one or more embodiments of the invention, a host operating system (not shown) for a blade (114, 126) may serve as host to multiple virtual machines (not shown). In such embodiments, each virtual machine includes a separate instance of a guest operating system. For example, the Xen® virtualization project allows for multiple guest operating systems executing in a host operating system. Xen® is a trademark overseen by the Xen Project Advisory Board. Further, in accordance with one or more embodiments of the invention, the virtual machines may include many different types of functionality, such as a switch, a router, a firewall, a load balancer, an application server, any other type of network-enabled service, or any combination thereof.

In one or more embodiments of the invention, a virtual network protocol stack (122, 132) may include an Internet Protocol (IP) layer, inbound and outbound virtual serialization queues, and a transport layer. The IP layer, for example, is configured to perform IP level processing for both inbound and outbound data packets. The inbound virtual serialization queue is a queue data structure configured to receive data packets from the IP layer prior to the data packets being processed by the transport layer. The transport layer may be configured to process inbound and outbound data packets in accordance with any transport layer protocols (e.g., Transmission Control Protocol (TCP), User Datagram Protocol (UDP), Datagram Congestion Control Protocol (DCCP), Fiber Channel Protocol (FCP), Stream Control Transmission Protocol (SCTP), Structured Stream Transport (SST), etc.). The outbound virtual serialization queue is a queue data structure configured to receive data packets from a VNIC (120, 130) with which the virtual network stack (122, 132) is associated.

In one or more embodiments of the invention, a virtual network interface card (VNIC (120, 130)) performs Media Access Control (MAC) layer functionality. In such embodiments of the invention, a VNIC (120, 130) may be configured to send and receive network traffic (i.e., data packets) between a virtual machine (116, 128) and a PNIC (100) operatively connected to the blade chassis. Accordingly, in such embodiments of the invention, the VNIC (120, 130) includes the functionality of a PNIC and appears as a PNIC to a virtual machine (116, 128) associated with the VNIC (120, 130).

In one or more embodiments of the invention, each virtual machine (116, 128) may be associated with an arbitrary number of VNICs, thereby providing increased flexibility in the types of networking functionality available to the virtual machines (116, 128). For example, a virtual machine (116, 128) may use a first VNIC for incoming network traffic and a second VNIC for outgoing network traffic. VNICs in accordance with one or more embodiments of the invention are described in detail in: (i) commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi; and (ii) commonly owned U.S. Pat. No. 7,613,132, entitled "Method and System for Controlling Virtual Machine Bandwidth" in the names of Sunay Tripathi, Tim P. Marsland, and Nicolas G. Droux. The contents of the aforementioned applications are hereby incorporated by reference in their entirety.

In one or more embodiments of the invention, a network function driver (118) is an interface configured to provide a virtual machine (116, 128) (e.g., executing on a blade (114, 126)) with direct access and control to a PNIC (100) operatively connected to the blade chassis. Specifically, as previously discussed, the network function driver (118) uses a network function (106) mapped between a virtual machine (116, 128) and the PNIC (100) to directly transfer network traffic (i.e., data packets) between the virtual machine (116, 128) and the PNIC (100).

In one or more embodiments of the invention, a chassis interconnect (112) may be used to connect one or more blades (114, 126) with shared computing resources (e.g., including but not limited to one or more PNICs, input/output means including such as a keyboard, mouse, or display monitor, and other computer components/peripherals). For example, the chassis interconnect (112) shown in FIG. 1a connects multiple blades (114, 126) with shared computing resources including a PNIC (100). Further, in one or more embodiments of the invention, the chassis interconnect (112) is used to connect and thereby enable communication among multiple blades (114, 126). In one or more embodiments of the invention, the connectivity provided by the chassis interconnect (112), as described above, is achieved without requiring use of traditional network wires (e.g., Ethernet cables).

In one or more embodiments of the invention, the chassis interconnect (112) may be a Peripheral Component Interface Express (PCI-E) backplane (e.g., as shown in FIG. 1a). In one or more embodiments of the invention, the PCI-E backplane (112) may include a number of PCI-E endpoints (not shown). Accordingly, in such embodiments, a PCI-E endpoint (not shown) is used to connect one or more blades (114, 126) with the blade chassis such that the blades (114, 126) may be configured to communicate (e.g., with another blade, with a shared resource operatively connected to the blade chassis) using PCI-E endpoints (i.e., as opposed to using traditional network wires). Those skilled in the art will appreciate that other connection technologies may be used to connect one or more blades (114, 126) to a blade chassis.

Figure 1B:
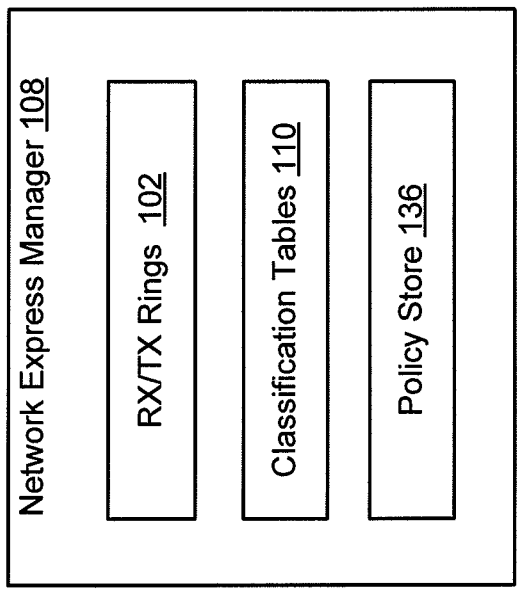

FIG. 1b shows components included in the NEM (108), in accordance with one or more embodiments of the invention. In one or more embodiments, the NEM (108) may be configured to manage internal communications between multiple blades (114, 126) in addition to internal communications between a blade (114, 126) and a PNIC (100). As such, the NEM (108) is configured to manage the routing of network traffic between the various components that operatively connected to a blade chassis. In one or more embodiments of the invention, the network express manager (108) may be any combination of hardware, software, and/or firmware including executable logic for performing the described network routing functions.

In one or more embodiments of the invention, the NEM (108) includes a virtual switching table (not shown). A virtual switching table, in accordance with one or more embodiments of the invention, includes one or more mappings that associate a VNIC identifier for a VNIC (120, 130) with a VNIC location in the chassis interconnect (112). In one or more embodiments, where the chassis interconnect (112) is a PCI-E backplane, the VNIC identifier for a VNIC (120, 130) may be an Internet Protocol (IP) addresses and the VNIC location may be a PCI-E endpoint associated with a blade (114, 126) upon which the VNIC (120, 130) is executing. In one or more embodiments, the VNIC identifiers are not used directly by the NEM (108), but rather are used indirectly via the network function (106).

In one or more embodiments of the invention, the management of the virtual switching table by the NEM (108) facilitates the creation of a virtual network path using one or more virtual wires. Accordingly, in such embodiments of the invention, virtual machines (116, 128) located in different blades (114. 126) may be interconnected to form an arbitrary virtual network topology, where the VNICs (120,130) associated with each virtual machine (116, 128) do not need to know the physical locations of other VNICs. Further, if a virtual machine (116, 128) is migrated from one blade to another, the virtual network topology may be preserved merely by updating the virtual switching table to reflect the a new physical location for the VNIC (i.e., a different PCI-E endpoint).

In one or more embodiments of the invention, the NEM (108) may include one or more classification tables (110). In one or more embodiments of the invention, a classification table (110) may be configured to store a first type of mapping that associates a Layer 2 (L2) address with a network function. In one or more embodiments of the invention, a L2 address is a data link layer address in accordance with the Open Systems Interconnection (OSI) model. In one or more embodiments of the invention, a classification table (110) may be configured to store a second type of mapping that associates a network function with a configuration. In one or more embodiments of the invention, a classification table (110) may be configured to store a third type of mapping that associates a key with a policy. In one or more embodiments of the invention, classification tables (110) may be stored by the NEM (108) using any persistent storage device and data format. For example, in one or more embodiments of the invention, the classification tables (110) may be stored as ternary content-addressable memory (TCAM) entries using a TCAM device. Examples of classification tables (110) are further discussed in relation to FIGS. 2a-2c.

In one or more embodiments of the invention, the NEM (108) may include multiple receive and transfer (RX/TX) rings (102). In one or more embodiments of the invention, one or more RX/TX rings (102) may be assigned to a specific VNIC (120, 130) for the temporary storage of inbound and outbound network traffic respectively.

In one or more embodiments of the invention, the classification tables (110) may include one or more entries describing resources assigned to each VNIC (120, 130), as well as data associated with each VNIC (120, 130). For example, one or more entries of the classification tables (110) may specify that a given VNIC (120, 130) is associated with one or more RX/TX rings (102), a link status (e.g., link speed, number of dropped packets, link up/down, link active/inactive, etc.), a MAC address, and the like.

In one or more embodiments of the invention, the NEM (108) may include a policy store (136) configured to store one or more policies. In one or more embodiments of the invention, a policy may be a deterministic algorithm that directs the routing of network traffic within the blade chassis (i.e., internal communication between blades or between a blade and a PNIC). In one or more embodiments of the invention, the policy store (136) is implemented using a persistent storage device.

In one or more embodiments of the invention, the NEM (108) and the PNIC (100) may be included as a single hardware module (not shown) operatively connected to the blade chassis. Alternatively, in one or more embodiments of the invention, the NEM (108) may be independently implemented apart from the PNIC (100) in hardware, software, or firmware.

FIGS. 2a-2c show examples of mappings used to maintain data in accordance with one or more embodiments of the invention. In one or more embodiments of the invention, the mappings discussed in relation to FIGS. 2a-2c are stored using one or more classification tables managed by the NEM. Further, in one or more embodiments of the invention, the classification tables may be implemented using ternary content-addressable memory (TCAM) (i.e., the mappings are TCAM entries).

FIG. 2a shows mappings that associate a Layer 2 (L2) address with a network function. As previously discussed, in one or more embodiments of the invention, a L2 address is a data link layer address in accordance with the Open Systems Interconnection (OSI) model. As previously discussed, in one or more embodiments of the invention, a network function may be a physical or virtual function used to manage data movement for the PNIC. In particular, FIG. 2a shows, by way of example, mappings between: (i) L2 address L2a and network function NFa; (ii) L2 address L2x and network function NFx; and (iii) L2 address L2z and network function NFz.

FIG. 2b shows mappings that associate a network function with a configuration. In one or more embodiments of the invention, a configuration may be one or more operating parameters for transmitting network traffic using the network function. In particular, FIG. 2b shows, by way of example, mappings between: (i) network function NFa and configuration Ca; (ii) network function NFx and configuration Cg; and (iii) network function NFz and configuration Cm.

In one or more embodiments of the invention, an operating parameter specified for a configuration may include but is not limited to a direct memory access (DMA) engine for implementing a direct data transfer path between a PNIC and a particular blade. In one or more embodiments of the invention, a DMA engine is a hard-wired data transmission device configured to implement a data path within a blade chassis for the transmission of data (e.g., data packets) from one component to another (e.g., from a PNIC to a blade).

FIG. 2c shows mappings that associate a key with a policy. In one or more embodiments of the invention, a key is a unique value that may be obtained as a function of a network function, a Layer 3 (L3) address, and a Layer 4 (L4) address. In one or more embodiments of the invention, a L3 address is a network layer address (e.g., IP address) in accordance with the OSI model. In one or more embodiments of the invention, a L4 address is a transport layer address (e.g., TCP address) in accordance with the OSI model. As previously discussed, in one or more embodiments of the invention, a policy may be a deterministic algorithm that directs the routing of network traffic within the blade chassis (e.g., internal communication between blades or between a blade and a PNIC). For example, policies may include dropping a packet if predefined criteria are met, enable or disable load spreading if predefined criteria are met, enable or disable L3/L4 classification, and the like. FIG. 2c shows, by way of example, mappings between: (i) key Ka and policy Pa; (ii) key Kx and policy Pg; and (iii) key Kz and policy Pm.

Figure 3A:
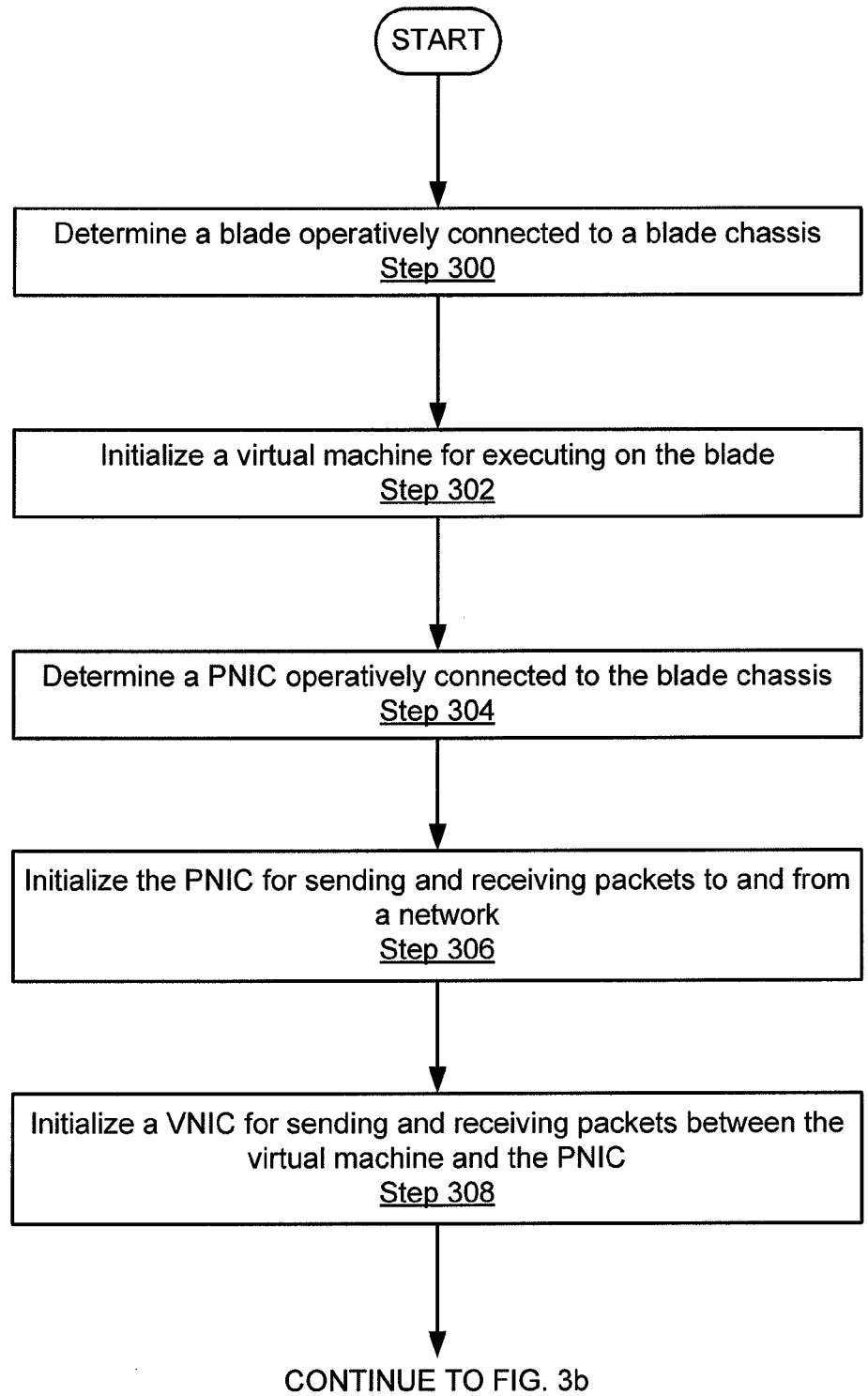
FIGS. 3a-3c show a flowchart in accordance with one or more embodiments of the invention.
Figure 3B:
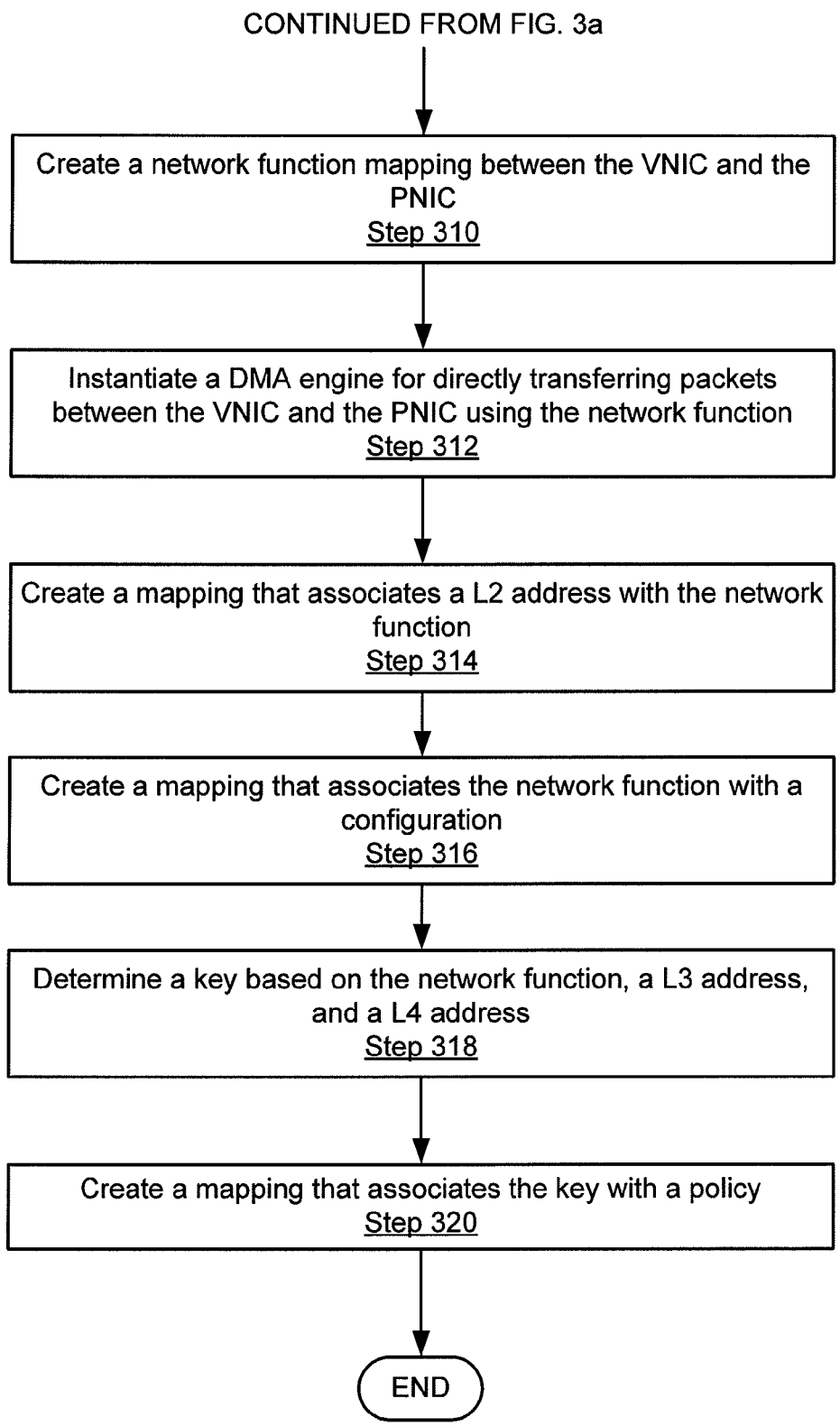
Figure 3C:
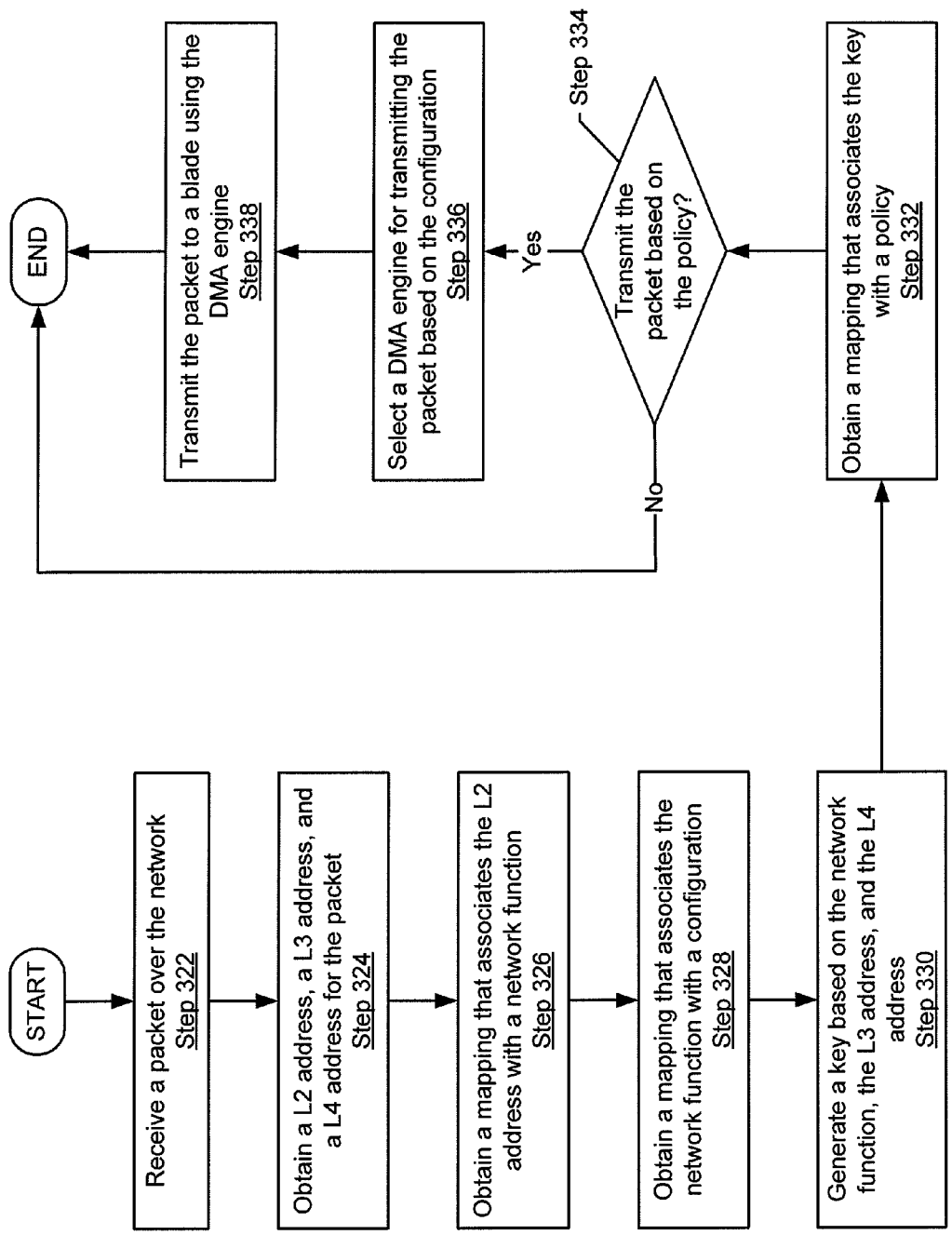

FIGS. 3a-3c show a flowchart in accordance with one or more embodiments of the invention. While the various steps in the flowchart are presented and described sequentially, one of ordinary skill in the art will appreciate that some or all of the steps may be executed in different orders, may be combined or omitted, and some or all of the steps may be executed in parallel.

The process in FIG. 3a may be used, for example when a blade chassis is booting, to initialize a PNIC and associated VNIC. Specifically, in one or more embodiments of the invention, a NEM may perform the steps of the process shown in FIG. 3a.

In Step 300, a blade operatively connected a blade chassis is determined. In In one or more embodiments of the invention where the blade chassis includes a PCI-E backplane, the blade is operatively connected to the blade chassis' PCI-E backplane using a PCI-E endpoint. In one or more embodiments of the invention, the blade that is determined may be one of many blades operatively connected to and determined for the blade chassis.

In Step 302, a virtual machine for executing on the blade is initialized. In one or more embodiments of the invention, the virtual machine is executing on a host operating system for the blade. In one or more embodiments of the invention, the virtual machine may itself host a guest operating system, which may be of a same or different type as the host operating system for the blade.

In Step 304, a PNIC operatively connected to the blade chassis is determined. In one or more embodiments of the invention, the determined PNIC is one of a number of PNICs operatively connected to the blade chassis (e.g., in a multi-root blade chassis configuration). Alternatively, in one or more embodiments of the invention, the determined PNIC is the only PNIC operatively connected to the blade chassis (e.g., in a single-root blade chassis configuration). Further, in Step 306, the determined PNIC is initialized to send and receive packets to and from a network (e.g., the Internet).

In Step 308, a VNIC for sending and receiving packets between the virtual machine and the PNIC (e.g., determined in Step 304 and initialized in Step 306) is initialized. At this time, the PNIC and a VNIC for sending and receiving network traffic to and from the PNIC are both initialized.

Additional blade chassis booting steps are discussed in relation to FIG. 3b. Specifically, the process in FIG. 3b may be used, for example, to implement a direct access data path between the PNIC and the VNIC as part of a packet classification scheme. In one or more embodiments of the invention, the NEM may perform the steps of the process shown in FIG. 3b.

In Step 310, a network function mapping is created between the VNIC (e.g., initialized in Step 308) and the PNIC (e.g., determined in Step 304 and initialized in Step 306). Specifically, in one or more embodiments of the invention, a network function is determined for the PNIC. Once the network function is determined for the PNIC, the network function mapping is created to associate the VNIC with the network function.

In Step 312, a DMA engine is instantiated for directly transferring network traffic (i.e., data packets) between the VNIC and the PNIC using the network function. Accordingly, the DMA engine may be used to transfer a data packet between the VNIC and the PNIC without requiring any additional processing by intermediate layers (e.g., host operating system, guest operating system, hypervisor, etc.).

In Step 314, a first mapping is created that associates a L2 address with the network function. In Step 316, a second mapping is created that associates the network function with a configuration. In one or more embodiments of the invention, the configuration specifies the DMA engine (e.g., instantiated in Step 312).

In Step 318, a key is determined based on the network function, a L3 address, and a L4 address. In one or more embodiments of the invention, the key is determined using a deterministic algorithm that generates a unique value (i.e., the key) for a set of inputs (i.e., the network function, the L3 address, and the L4 address).

In Step 320, a third mapping is created that associates the key with a policy. In one or more embodiments of the invention, the policy may be a deterministic algorithm that directs the routing of network traffic within the blade chassis (i.e., internal communication between blades or between a blade and a PNIC). In one or more embodiments of the invention, the policy store (136) is implemented using a persistent storage device.

As discussed, in one or more embodiments of the invention, the first, second, and third mappings may be stored as TCAM entries using a TCAM device.

The process in FIG. 3c may be used, for example, to route network traffic (i.e., data packets) using a packet classification scheme. A packet classification scheme, in accordance with one or more embodiments of the invention, involves the use of mappings in a classification table to implement the routing of network traffic among the components in a blade chassis. In one or more embodiments of the invention, the NEM may perform the steps of the process shown in FIG. 3c.

In Step 322, a packet is received over a network. As discussed, the packet includes a packet header and a payload. In Step 324, a L2 address, a L3 address, and a L4 address are obtained for the packet. In one or more embodiments of the invention, the L2 address, the L3 address, and the L4 address for the packet are obtained using the packet header.

In Step 326, a first mapping is obtained that associates the L2 address for the packet with a network function. In Step 328, a second mapping is obtained that associates the network function with a configuration.

In Step 330, a key is generated based on the network function, the L3 address, and the L4 address. Specifically, in accordance with one or more embodiments of the invention, the key may be generated using a deterministic algorithm that generates a unique value (i.e., the key) for a set of inputs (i.e., the network function, the L3 address, and the L4 address) in accordance with one or more embodiments of the invention. In Step 332, a third mapping is obtained that associates the key with a policy.

In Step 334, a determination is made, based on the policy, as to whether the packet should be transmitted. As previously discussed, a policy may be a deterministic algorithm that directs the routing of network traffic within the blade chassis (i.e., internal communication between blades or between a blade and a PNIC). Accordingly, in one or more embodiments of the invention, a policy may direct the NEM to route a data packet to a particular blade or discard the data packet (i.e., do not transmit the packet any further).

In Step 336, a DMA engine is selected for transmitting the packet based on the configuration. As discussed, configuration may specify a particular DMA engine in accordance with one or more embodiments of the invention. In Step 338, the packet is transmitted to a blade (e.g., determined according to a policy) using the DMA engine (e.g., determined according to a configuration).

In one or more embodiments of the invention, the packet may be initially received by a PNIC (e.g., as part of Step 322) and subsequently processed by the NEM according to the steps shown in FIG. 3c. Further, in accordance with one or more embodiments of the invention, the first, the second, and the third mappings are stored as TCAM entries using a ternary content-addressable memory. Accordingly, in such embodiments of the invention, the first, second, and third mappings may be obtained by performing a TCAM lookup operation.

Figure 4A:
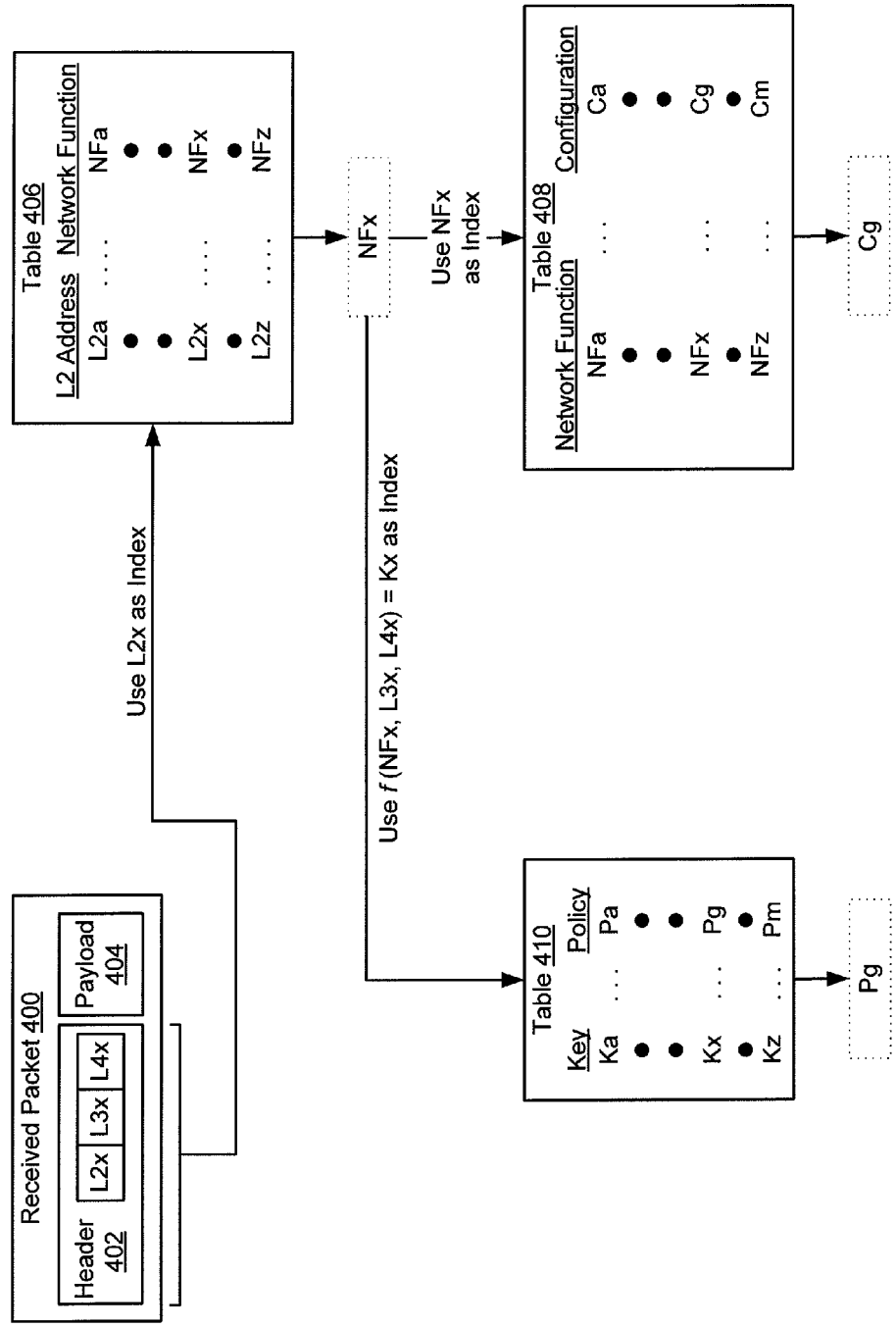
FIGS. 4a-4b show an example of how a packet classification scheme may be used to route network traffic in accordance with one or more embodiments of the invention.
Figure 4B:
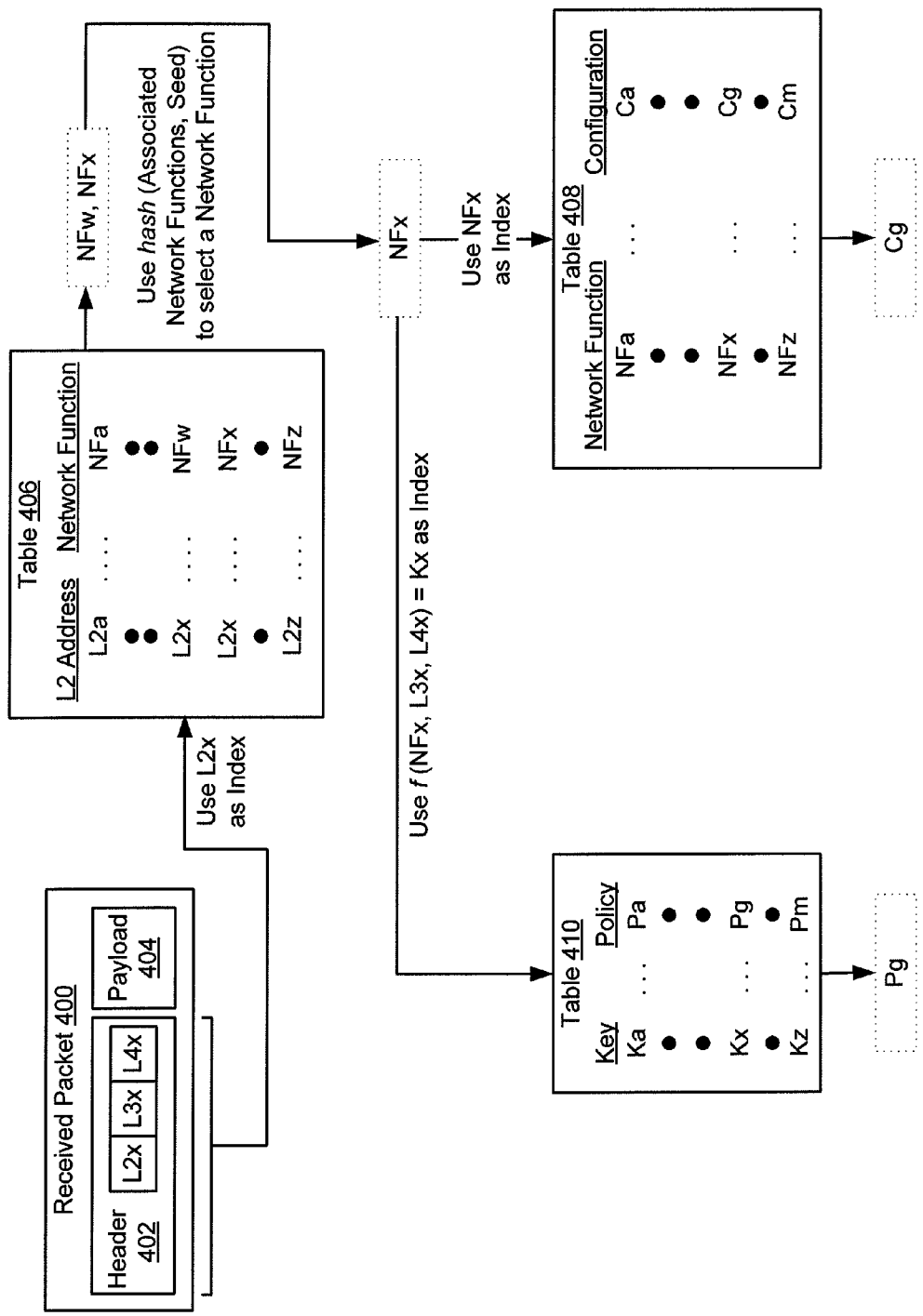

FIGS. 4a-4b show an example of how a packet classification scheme may be used to route network traffic in accordance with one or more embodiments of the invention.

In FIG. 4a, a NEM (not shown) receives a packet (Received Packet (400)). The Received Packet (400) includes a packet header (402) and a packet payload (404). The packet header (402) for the Received Packet (400) specifies a L2 address, a L3 address, and a L4 address—L2x, L3x, and L4x respectively.

FIG. 4a shows a first classification table (406) that includes multiple mappings that associate a L2 address with a network function. In performing a lookup operation of the first classification table (406), the NEM uses the L2 address, L2x, as an index to determine the network function NFx.

As shown in FIG. 4a, a second classification table (408) includes multiple mappings that associate a network function with a configuration. Accordingly, the network function NFx (e.g., obtained from performing a lookup operation of the first classification table (406)) may be used as an index to determine a configuration Cg by performing a lookup operation of the second classification table (408).

As shown in FIG. 4a, a third classification table (410) includes multiple mappings that associate a key with a policy. The NEM uses the network function NFx, the L3 address L3x, and the L4 address L4x to generate a key K. Using the generated key Kx as an index to perform a lookup operation of the third classification table (410), the NEM determines policy Pg.

Having determined policy Pg, the NEM may then make the determination as to whether to transmit Received Packet (400) based on Pg. If the determination is that Received Packet (400) should not be transmitted, then Received Packet (400) is merely discarded. Alternatively, if the determination is that Received Packet (400) should be transmitted, then a DMA engine (not shown) is selected based on Cg. In particular, Cg may specify that a particular DMA engine should be used. Once a DMA engine is determined, the DMA engine is used to transmit Received Packet (400) to a particular blade.

In FIG. 4b, a NEM (not shown) receives a packet (Received Packet (400)). The Received Packet (400) includes a packet header (402) and a packet payload (404). The packet header (402) for the Received Packet (400) specifies a L2 address, a L3 address, and a L4 address—L2x, L3x, and L4x respectively.

FIG. 4b shows a first classification table (406) that includes multiple mappings that associate a L2 address with a network function. However, unlike the first classification table shown in FIG. 4a, the first classification table (406) of FIG. 4b shows that more than one network function may be associated with a particular L2 address. Specifically, the first classification table (406) shows that L2x is associated with network functions NFw and NFx. To determine which of the two network functions may be used, the NEM may perform a hash operation based on the eligible network functions (i.e., NFw and NFx) and a seed value. In one or more embodiments of the invention, the seed value may be randomly generated or determined based on a system timestamp or some other means of obtaining a number arbitrarily. As shown in FIG. 4b, based upon a hash operation as described above, the NEM determines that network function NFx will be used in the transmitting of the Received Packet (400).

The remaining packet classification steps are repeated as previously described in relation to FIG. 4a. For example, the network function NFx, as determined by a lookup operation of the first classification table (406) and a hash operation, may then be used as an index to determine a configuration Cg by performing a lookup operation of the second classification table (408). Further, the NEM uses the network function NFx, the L3 address L3x, and the L4 address L4x to generate a key K. Using the generated key Kx as an index to perform a lookup operation of the third classification table (410), the NEM determines policy Pg.

Having determined policy Pg, the NEM may then make the determination as to whether to transmit Received Packet (400) based on Pg. If the determination is that Received Packet (400) should not be transmitted, then Received Packet (400) is merely discarded. Alternatively, if the determination is that Received Packet (400) should be transmitted, then a DMA engine is selected based on Cg. In particular, Cg may specify that a particular DMA engine should be used. Once a DMA engine is determined, the DMA engine is used to transmit Received Packet (400) to a particular blade.

In one or more embodiments of the invention, the packet classification scheme, as described above, may provide a flexible framework for implementing network routing within the blade chassis. In particular, embodiments of the invention enable dynamic management of classification resources and policies assigned to virtual network devices while maintaining seamless classification of packets. For example, any mapping from the first classification table (i.e., a mapping that associates a L2 address with a network function) may be modified (e.g., at run-time) to change the routing for a data packet specifying the L2 address in its packet header. For example, using the first classification table (406) from FIG. 4a as a reference, assume that the mapping that associates L2x with NFx is modified to associate L2x with network function NFy instead. As a result of this modification, the subsequent lookup operations involving the second and third classification tables (408 and 410 respectively) are now different in that different index values are used. Regarding the lookup operation of the second classification table (408), the index value is now NFy instead of NFx. Accordingly, the lookup operation references a different table entry than before and therefore could conceivably determine a different configuration than before. Likewise, the key generated for the lookup operation of the third classification table (410) is now a function of inputs NFy, L3x, and L4x rather than inputs NFx, L3x, and L4x. Accordingly, the lookup operation uses a different key for indexing into the table and therefore references a different table entry than before. As such, the result of the lookup operation could conceivably determine a different configuration than before.

Figure 5:
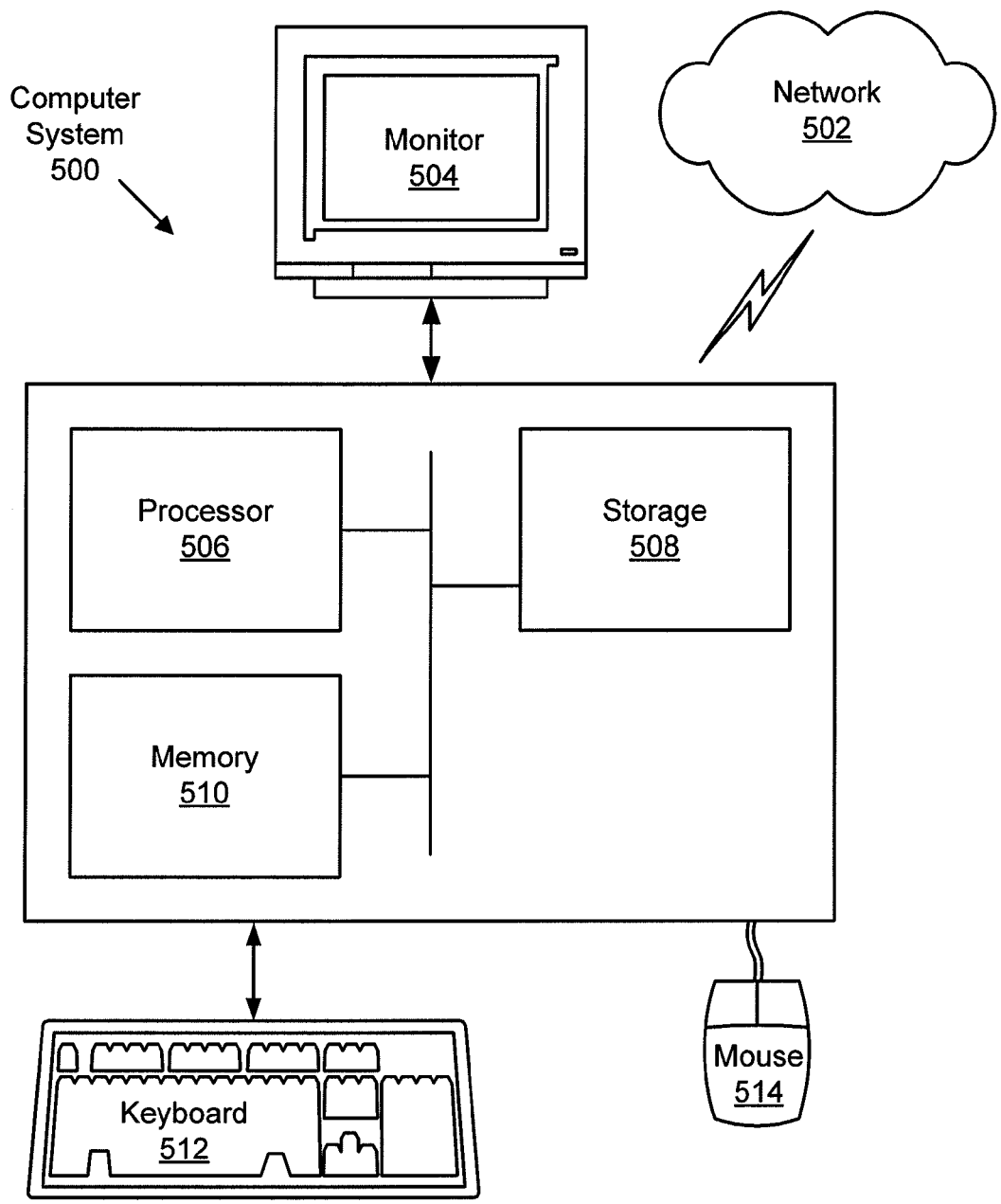
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processors (506), associated memory (510) (e.g., random access memory (RAM), cache memory, flash memory, etc.), a storage device (508) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (512), a mouse (514), or a microphone (not shown). Further, the computer (500) may include output means, such as a monitor (504) (e.g., a liquid crystal display (LCD), a plasma display, or cathode ray tube (CRT) monitor). The computer system (500) may be connected to a network (502) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

Further, instructions to perform embodiments of the invention may be stored on a computer readable storage medium such as a compact disc (CD), a diskette, a tape, physical memory, or any other tangible computer readable storage medium that includes functionality to store computer readable program code to perform embodiments of the invention. In one embodiment of the invention the instructions, when executed by a processor(s), are configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for routing network traffic for a blade server chassis, comprising:
 receiving a first packet by a network express manager (NEM) executing on a processor for the blade server chassis, wherein the blade server chassis comprises the NEM, a chassis interconnect, a plurality of blades operatively connected to the chassis interconnect, and a physical network interface card (PNIC), and wherein a first packet header for the first packet specifies a first Layer 2 (L2) address, a first Layer 3 (L3) address, and a first Layer 4 (L4) L4 address;
 obtaining, by the NEM, the first L2 address, the first L3 address, and the first L4 address from the first packet;
 obtaining, by the NEM, a first mapping that associates the first L2 address with a first network function;
 obtaining, by the NEM, a second mapping that associates the first network function with a first configuration;
 generating, by the NEM, a first key based on the first network function, the first L3 address, and the first L4 address;
 obtaining, by the NEM, a third mapping that associates the first key with a first policy;
 making a first determination, by the NEM, to transmit the first packet based on the first policy; and
 based on the first determination:
  selecting, by the NEM, a first direct memory access (DMA) engine for transmitting the first packet based on the first configuration, and
  transmitting, by the NEM, the first packet to a first blade from the plurality of blades using the first DMA engine and the first network function.

2. The method of claim 1, further comprising:
 modifying, by the NEM, the first mapping to associate the first L2 address with a second network function;
 receiving, by the NEM, a second packet by the NEM, wherein a second packet header for the second packet specifies the first L2 address, the first L3 address, and the first L4 address;
 obtaining, by the NEM, the first L2 address, the first L3 address, and the first L4 address from the second packet;
 obtaining, by the NEM, the first mapping that associates the first L2 address with the second network function;
 obtaining, by the NEM, a fourth mapping that associates the second network function with a second configuration;
 generating, by the NEM, a second key based on the second network function, the first L3 address, and the first L4 address;
 obtaining, by the NEM, a fifth mapping that associates the second key with a second policy;
 making, by the NEM, a second determination to transmit the second packet based on the second policy; and
 based on the second determination:
  selecting, by the NEM, a second DMA engine for transmitting the second packet based on the second configuration, and
  transmitting, by the NEM, the second packet to a second blade from the plurality of blades using the second DMA engine and the second network function.

3. The method of claim 1, further comprising:
 modifying, by the NEM, the first mapping to associate the first L2 address with a second network function;
 receiving, by the NEM, a second packet by the NEM, wherein a second packet header for the second packet specifies the first L2 address, a second L3 address, and a second L4 address;
 obtaining, by the NEM, the first L2 address, the second L3 address, and the second L4 address from the second packet;
 obtaining, by the NEM, the first mapping that associates the first L2 address with the second network function;
 obtaining, by the NEM, a fourth mapping that associates the second network function with a second configuration;
 generating, by the NEM, a second key based on the second network function, the second L3 address, and the second L4 address;
 obtaining, by the NEM, a fifth mapping that associates the second key with a second policy;
 making, by the NEM, a second determination to transmit the second packet based on the second policy; and
 based on the second determination:

selecting, by the NEM, a second DMA engine for transmitting the second packet based on the second configuration, and transmitting, by the NEM, the second packet to a second blade from the plurality of blades using the second DMA engine and the second network function.

4. The method of claim 1, further comprising:
instantiating, by the NEM, the first DMA engine for directly transferring packets between a first virtual network interface card (VNIC) executing on the first blade and the PNIC using the first network function;
creating, by the NEM, the first mapping for associating the first L2 address with the first network function;
creating, by the NEM, the second mapping for associating the first network function with the first configuration;
generating, by the NEM, the first key based on the first network function, the first L3 address, and the first L4 address; and
creating, by the NEM, the third mapping for associating the first key with the first policy.

5. The method of claim 1, wherein the chassis interconnect is a Peripheral Component Interface Express (PCI-E) backplane comprising a plurality of PCI-E endpoints, and wherein the first blade connects to the blade server chassis using a first PCI-E endpoint from the plurality of PCI-E endpoints.

6. The method of claim 5, wherein the blade server chassis further comprises a virtual switching table (VST) associated with the NEM, wherein the VST associates a first Internet Protocol (IP) address for a first VNIC executing on the first blade with the first PCI-E endpoint.

7. A system, comprising:
a physical network interface card (PNIC);
a chassis interconnect;
a plurality of blades operatively connected to the chassis interconnect;
a ternary content-addressable memory (TCAM) device comprising a plurality of mappings; and
a network express manager (NEM) executing on a processor, wherein the NEM is configured to:
receive a first packet, wherein the first packet specifies a first Layer 2 (L2) address, a first Layer 3 (L3) address, and a first Layer 4 (L4) address;
obtain the first L2 address, the first L3 address, and the first L4 address from the first packet;
obtain a first mapping from the plurality of mappings that associates the first L2 address with a first network function;
obtain a second mapping from the plurality of mappings that associates the first network function with a first configuration;
generate a first key based on the first network function, the first L3 address, and the first L4 address;
obtain a third mapping from the plurality of mappings that associates the first key with a first policy;
make a first determination to transmit the first packet based on the first policy; and
based on the first determination:
select a first direct memory access (DMA) engine for transmitting the first packet based on the first configuration, and
transmit the first packet to a first blade from the plurality of blades using the first DMA engine and the first network function.

8. The system of claim 7, wherein the NEM is further configured to:
modify the first mapping to associate the first L2 address with a second network function;
receive a second packet, wherein the second packet specifies the first L2 address, the first L3 address, and the first L4 address;
obtain the first L2 address, the first L3 address, and the first L4 address from the second packet;
obtain the first mapping that associates the first L2 address with the second network function;
obtain a fourth mapping that associates the second network function with a second configuration;
generate a second key based on the second network function, the first L3 address, and the first L4 address;
obtain a fifth mapping that associates the second key with a second policy;
make a second determination to transmit the second packet based on the second policy; and
based on the second determination:
select a second DMA engine for transmitting the second packet based on the second configuration, and
transmit the second packet to a second blade from the plurality of blades using the second DMA engine and the second network function.

9. The system of claim 7, wherein the NEM is further configured to:
modify the first mapping to associate the first L2 address with a second network function;
receive a second packet, wherein the second packet specifies the first L2 address, a second L3 address, and a second L4 address;
obtain the first L2 address, the second L3 address, and the second L4 address from the second packet;
obtain the first mapping that associates the first L2 address with the second network function;
obtain a fourth mapping that associates the second network function with a second configuration;
generate a second key based on the second network function, the second L3 address, and the second L4 address;
obtain a fifth mapping that associates the second key with a second policy;
make a second determination to transmit the second packet based on the second policy; and
based on the second determination:
select a second DMA engine for transmitting the second packet based on the second configuration, and
transmit the second packet to a second blade from the plurality of blades using the second DMA engine and the second network function.

10. The system of claim 7, wherein the first blade comprises a first virtual network interface card (VNIC) executing on the first blade, and wherein the NEM is further configured to:
instantiate the first DMA engine for directly transferring packets between the first VNIC and the PNIC using the first network function;
create the first mapping for associating the first L2 address with the first network function;
create the second mapping for associating the first network function with the first configuration;
generate the first key based on the first network function, the first L3 address, and the first L4 address; and
create the third mapping for associating the first key with the first policy.

11. The system of claim 7, wherein the chassis interconnect is a Peripheral Component Interface Express (PCI-E) backplane comprising a plurality of PCI-E endpoints, and wherein the first blade connects to a blade server chassis using a first PCI-E endpoint from the plurality of PCI-E endpoints.

12. The system of claim 11, wherein the blade server chassis further comprises a virtual switching table (VST) associated with the NEM, wherein the VST associates a first Internet Protocol (IP) address for a first VNIC executing on the first blade with the first PCI-E endpoint.

13. A non-transitory computer readable storage medium comprising software instructions, which when executed by a processor, perform a method, the method comprising:
- receiving a first packet by a network express manager (NEM) executing on a processor for a blade server chassis, wherein a blade server chassis comprises the NEM, a chassis interconnect, a plurality of blades operatively connected to the chassis interconnect, and a physical network interface card (PNIC), and wherein a first packet header for the first packet specifies a first Layer 2 (L2) address, a first Layer 3 (L3) address, and a first Layer 3 (L4) address;
- obtaining, by the NEM, the first L2 address, the first L3 address, and the first L4 address from the first packet;
- performing, by the NEM, a hash of the first L2 address to select a first network function from a plurality of network functions associated with the first L2 address, wherein the first L2 address is associated with the first network function using a first mapping;
- obtaining, by the NEM, a second mapping that associates the first network function with a first configuration;
- generating, by the NEM, a first key based on the first network function, the first L3 address, and the first L4 address;
- obtaining, by the NEM, a third mapping that associates the first key with a first policy;
- making a first determination, by the NEM, to transmit the first packet based on the first policy; and
- based on the first determination:
  - selecting, by the NEM, a first direct memory access (DMA) engine for transmitting the first packet based on the first configuration, and
  - transmitting, by the NEM, the first packet to a first blade from the plurality of blades using the first DMA engine and the first network function.

14. The non-transitory computer readable storage medium of claim 13, the method further comprising:
- modifying, by the NEM, the first mapping to associate the first L2 address with a second network function;
- receiving, by the NEM, a second packet by the NEM, wherein a second packet header for the second packet specifies the first L2 address, the first L3 address, and the first L4 address;
- obtaining, by the NEM, the first L2 address, the first L3 address, and the first L4 address from the second packet;
- performing, by the NEM, a hash of the first L2 address to select the second network function from the plurality of network functions associated with the first L2 address;
- obtaining, by the NEM, a fourth mapping that associates the second network function with a second configuration;
- generating, by the NEM, a second key based on the second network function, the first L3 address, and the first L4 address;
- obtaining, by the NEM, a fifth mapping that associates the second key with a second policy;
- making, by the NEM, a second determination to transmit the second packet based on the second policy; and
- based on the second determination:
  - selecting, by the NEM, a second DMA engine for transmitting the second packet based on the second configuration, and
  - transmitting, by the NEM, the second packet to a second blade from the plurality of blades using the second DMA engine and the second network function.

15. The non-transitory computer readable storage medium of claim 13, the method further comprising:
- modifying, by the NEM, the first mapping to associate the first L2 address with a second network function;
- receiving, by the NEM, a second packet by the NEM, wherein a second packet header for the second packet specifies the first L2 address, a second L3 address, and a second L4 address;
- obtaining, by the NEM, the first L2 address, the second L3 address, and the second L4 address from the second packet;
- performing, by the NEM, a hash of the first L2 address to select the second network function from the plurality of network functions associated with the first L2 address;
- obtaining, by the NEM, a fourth mapping that associates the second network function with a second configuration;
- generating, by the NEM, a second key based on the second network function, the second L3 address, and the second L4 address;
- obtaining, by the NEM, a fifth mapping that associates the second key with a second policy;
- making, by the NEM, a second determination to transmit the second packet based on the second policy; and
- based on the second determination:
  - selecting, by the NEM, a second DMA engine for transmitting the second packet based on the second configuration, and
  - transmitting, by the NEM, the second packet to a second blade from the plurality of blades using the second DMA engine and the second network function.

16. The non-transitory computer readable storage medium of claim 13, the method further comprising:
- instantiating, by the NEM, the first DMA engine for directly transferring packets between a first virtual network interface card (VNIC) executing on the first blade and the PNIC using the first network function;
- creating, by the NEM, the first mapping for associating the first L2 address with the first network function;
- creating, by the NEM, the second mapping for associating the first network function with the first configuration;
- generating, by the NEM, the first key based on the first network function, the first L3 address, and the first L4 address; and
- creating, by the NEM, the third mapping for associating the first key with the first policy.

17. The non-transitory computer readable storage medium of claim 13, wherein the chassis interconnect is a Peripheral Component Interface Express (PCI-E) backplane comprising a plurality of PCI-E endpoints, and wherein the first blade connects to the blade server chassis using a first PCI-E endpoint from the plurality of PCI-E endpoints.

18. The non-transitory computer readable storage medium of claim 17, wherein the blade server chassis further comprises a virtual switching table (VST) associated with the NEM, wherein the VST associates a first Internet Protocol (IP) address for a first VNIC executing on the first blade with the first PCI-E endpoint.

* * * * *

UNITED STATES PATENT AND TRADEMARK OFFICE
CERTIFICATE OF CORRECTION

| | | |
|---|---|---|
| PATENT NO. | : 8,634,415 B2 | Page 1 of 1 |
| APPLICATION NO. | : 13/028650 | |
| DATED | : January 21, 2014 | |
| INVENTOR(S) | : Srinivasan et al. | |

It is certified that error appears in the above-identified patent and that said Letters Patent is hereby corrected as shown below:

On Title page 3, column 1, item (56), under Other Publications, line 14, delete "Provising" and insert -- Providing --, therefor.

On Title page 3, column 2, item (56), under Other Publications, line 10, delete "Architectual" and insert -- Architectural --, therefor.

On Title page 3, column 2, item (56), under Other Publications, line 17, delete "pges." and insert -- pages. --, therefor.

In the Specification:

In column 1, line 61, after "(L4)" delete "L4".

In column 3, line 61, delete "datapath" and insert -- data path --, therefor.

In column 7, line 39, after "the" delete "a".

In column 11, line 25-28, delete "The Received...respectively." and insert the same on Col. 11, Line 24 after "(400))." as a continuation of the same paragraph.

In column 11, line 44, delete "K." and insert -- Kx. --, therefor.

In column 12, line 22, delete "K." and insert -- Kx. --, therefor.

In the Claims:

In column 13, line 61, in Claim 1, after "(L4)" delete "L4".

In column 17, line 18, in Claim 13, delete "Layer 3" and insert -- Layer 4 --, therefor.

Signed and Sealed this
Twenty-fourth Day of June, 2014

Michelle K. Lee
*Deputy Director of the United States Patent and Trademark Office*